United States Patent
Andrick et al.

(10) Patent No.: US 11,401,810 B2
(45) Date of Patent: **\*Aug. 2, 2022**

(54) REMOVABLE AND REPLACEABLE ANCHORED TUNNEL GASKET

(71) Applicant: Vertex, Inc., Mogadore, OH (US)

(72) Inventors: William C. Andrick, North Canton, OH (US); Richard J. Bowers, Akron, OH (US); Troy Davidson, Canton, OH (US); James A. Westhoff, Langhorne, PA (US); George M. Stamper, Akron, OH (US)

(73) Assignee: Vertex, Inc., Mogadore, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,476

(22) Filed: Oct. 28, 2020

(65) Prior Publication Data

US 2021/0079791 A1    Mar. 18, 2021

Related U.S. Application Data

(63) Continuation-in-part of application No. 16/248,184, filed on Jan. 15, 2019, now Pat. No. 10,954,668.

(Continued)

(51) Int. Cl.
*E21D 11/08* (2006.01)
*F16J 15/02* (2006.01)

(52) U.S. Cl.
CPC ........... *E21D 11/083* (2013.01); *F16J 15/025* (2013.01); *F16J 15/027* (2013.01)

(58) Field of Classification Search
CPC ............. E04B 1/6807; E04B 1/6813; E04B 2001/6818; E21D 11/385; E21D 11/05; B28B 21/563; E02D 29/045; E02D 29/16
See application file for complete search history.

(56) References Cited

U.S. PATENT DOCUMENTS

| | | | |
|---|---|---|---|
| 4,195,850 A | ‡ | 4/1980 | Berger et al. |
| 5,888,023 A | * | 3/1999 | Grabe .................. E21D 11/385 |
| | | | 405/152 |

(Continued)

FOREIGN PATENT DOCUMENTS

| | | |
|---|---|---|
| DE | 39 34 198 C2 ‡ | 4/1991 |
| EP | 0 270 287 B1 | 3/1991 |

(Continued)

OTHER PUBLICATIONS

Herrenknecht Formwork Combisegments: One Pass Segmental Lining Technology, Herrenknecht Formwork Technology GmbH, 6 page flyer, Dec. 2014.

(Continued)

*Primary Examiner* — Patrick J Maestri
(74) *Attorney, Agent, or Firm* — Fay Sharpe LLP

(57) ABSTRACT

A gasket for concrete structures such as tunnel segments includes a gasket body having a bottom face configured to be positioned against a surface of an associated tunnel segment. The bottom face may include a set of spaced indentations. First and second anchor members protrude from opposed side edges of the gasket adjacent the bottom face of the gasket. The anchor members are configured to attach the gasket to the tunnel segment during casting of a precast concrete member. The gasket body forms a groove in the concrete member and the anchor members form side channels in the groove. A respective fin can be provided on opposed side faces of the gasket. Should a defect be found in the original gasket, the gasket body can be removed from the groove of the concrete member relatively easily, even in the field, and a replacement gasket having corresponding anchor members, fins and indentations, can be snapped into the groove.

17 Claims, 7 Drawing Sheets

Related U.S. Application Data

(60) Provisional application No. 62/619,399, filed on Jan. 19, 2018.

(56) References Cited

U.S. PATENT DOCUMENTS

| | | | | |
|---|---|---|---|---|
| 6,129,485 | A ‡ | 10/2000 | Grabe | E21D 11/385 277/62 |
| 6,612,585 | B2 ‡ | 9/2003 | Grabe | E21D 11/385 277/626 |
| 7,488,900 | B1 ‡ | 2/2009 | Kline | |
| 7,922,179 | B2 ‡ | 4/2011 | Andrick | F16L 21/03 277/61 |
| 9,556,734 | B2 ‡ | 1/2017 | Carr | E21D 11/385 |
| 9,631,362 | B2 ‡ | 4/2017 | Hensley | E21D 11/385 |
| 9,797,818 | B2 ‡ | 10/2017 | Fischer | G01N 3/08 |
| 2002/0153671 | A1 ‡ | 10/2002 | Raymond | F16L 17/067 277/60 |
| 2002/0164211 | A1 ‡ | 11/2002 | Gutschmidt | E21D 11/385 405/15 |
| 2003/0168819 | A1* | 9/2003 | Gutschmidt | E21D 11/385 277/628 |
| 2009/0148658 | A1 ‡ | 6/2009 | Gutschmidt | E21D 11/385 428/13 |
| 2015/0259905 | A9 ‡ | 9/2015 | Hensley | E04B 1/6815 52/309 |

FOREIGN PATENT DOCUMENTS

| | | |
|---|---|---|
| EP | 0270287 B1 ‡ | 3/1991 |
| WO | WO 99/54593 ‡ | 10/1999 |
| WO | WO 01/53657 A1 ‡ | 7/2001 |
| WO | WO 2017/134420 A1 ‡ | 8/2017 |

OTHER PUBLICATIONS https://www.vip-polymers.com/products-item/cast-in-anchored-tunnel-segment-gaskets/, "Cast-In Tunnel Segments Gaskets" (Nov. 9, 2017) 7 pages.
www.vip-polymers.com, "Globally Approved Sealing Gaskets", 7 pages (pp. 1-11) (2017).
VIP-Polymers Ltd. Flyer Entitled "Why Tunnel Segment Gasket Corner Design Is Important", 1 page, 2019.
http://tunnelingonline.com/tunnel-segment-gaskets-cast-vs-non-cast/, Tunnel Business Magazine, "Tunnel Segment Gaskets: Cast vs. Non-cast", 7 pages (Dec. 22, 2016).
https://youtube/b_9cSGp7tpw, "Herrenknecht Formwork Combisegments Lining Panels", 2 Screengrabs, Jan. 14, 2020.
Datwyler Tunneling Brochure, "Datwyler Tunnel Gasket Solutions", 7 pages (pp. 1-11) (May 2017).
Datwyler Sealing Technologies Brochure, "Seals For Tunnel Construction—Sealing Profiles for Modern Tunnelling Methods", 12 pages (2017).
Datwyler Anchored Gaskets Brochure, 2 pages (2017).
www.arsankaucuk.com.tr, ASG Tunnel Segment Gaskets Brochure, 8 pages, (2017).

\* cited by examiner
‡ imported from a related application

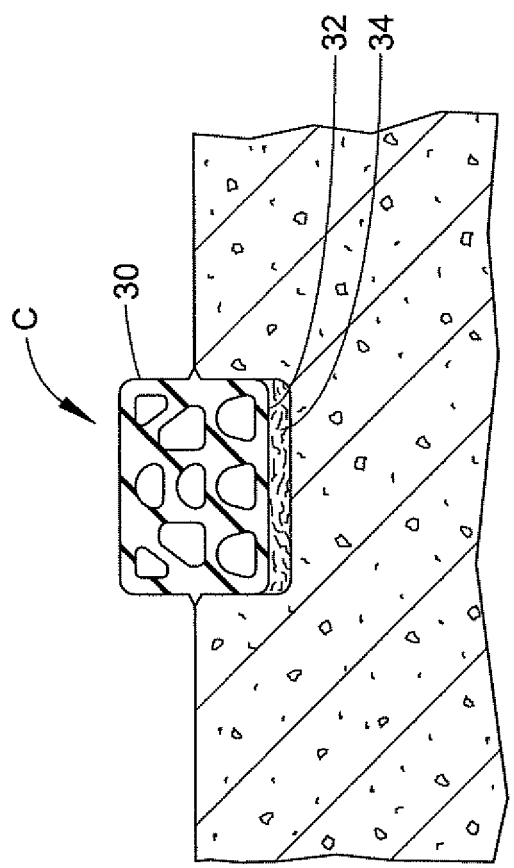
FIG. 3
(PRIOR ART)
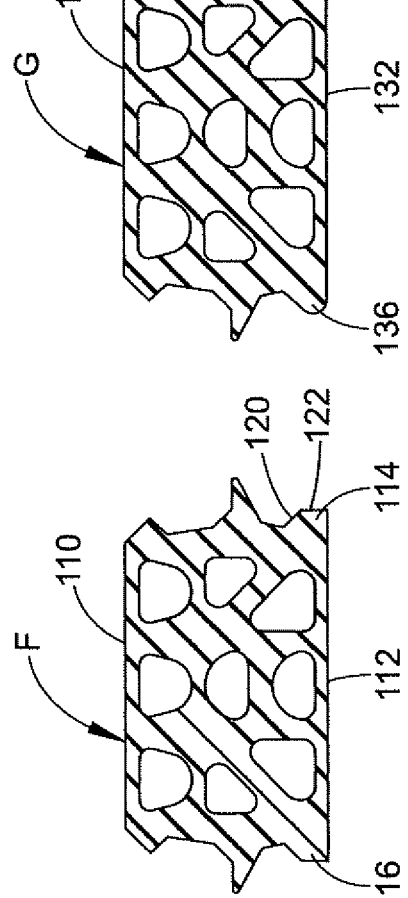
FIG. 6C
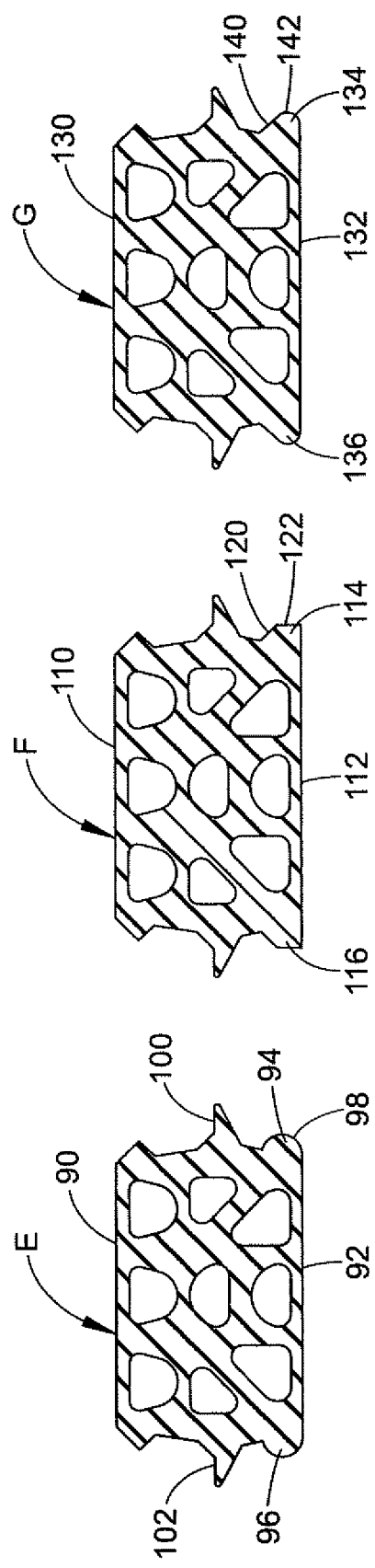
FIG. 6B
FIG. 6A

REMOVABLE AND REPLACEABLE ANCHORED TUNNEL GASKET

This application is a continuation-in-part of U.S. patent application Ser. No. 16/248,184 which was filed on Jan. 15, 2019. That application claims the benefit of Provisional Application Ser. No. 62/619,399 which was filed on Jan. 19, 2018. The entire contents of both applications are incorporated hereinto by reference.

BACKGROUND

The present disclosure pertains to gaskets or seals for sealing concrete structures, for example, the joints of tunnel segments.

In the construction of tunnels, the contact surfaces of two abutting tunnel segments, which are generally made of precast concrete, must be sealed against the inflow or outflow of liquids, most frequently water. Such tunnels may be subway tunnels, river crossing tunnels, road and railway tunnels, cable tunnels, waste water and water supply tunnels, among other types. As a general rule, the water pressure against which the seal is provided can be in the range of between 1 and 4 bar. But water pressures are site specific and dependent on geological conditions. Reliable sealing should be insured between tunnel segments so as to prevent or retard the ingress and egress of liquids, such as water.

The current art in the field of segmented tunnel construction utilizes two basic types of gaskets. The first of these employs glued-on gasket segments. Glued gaskets are the traditional kind of installation. In this type of gasket, the concrete tunnel segment is precast with a groove being defined in the segment. The gasket is then installed in the groove with an adhesive to keep the gasket in place. If a defect is found in a glued-in gasket, either at the manufacturing facility or in the field, the gasket needs to be removed and another gasket glued into the groove in place of the removed gasket. Also, if the groove has been damaged during the removal of a defective gasket, the groove itself must be repaired first. Such repair may be problematic in the field.

Another type of segmented tunnel construction employs a gasket having anchor legs. In other words, the gasket segment is held in place as the concrete member is cast. With this type of construction, the gasket is preinstalled in a concrete form or mold and the concrete is then poured around the gasket so that the legs or anchors of the gasket are trapped in the concrete segment being formed. After curing, the segment is demolded and removed with the anchored gasket embedded into the concrete segment. Thus, the gasket is anchored in the concrete member by anchoring legs which provide a positive locking fit. For example, the anchoring legs can have a dove-tailed configuration or be provided with a cross-section that increases towards the bottom or distal face of the anchoring leg or foot. Alternatively, or additionally, the anchoring foot can be provided with a barb or undercuts and the like.

With anchored gaskets, if the gasket is damaged, then the concrete segment may need to be discarded because there is no easy way of removing such an embedded gasket from the concrete member so as to replace it with another one. If a defect is found in the anchored gasket during inspection at the manufacturing facility, current art requires significant effort to remove the gasket from the concrete segment. Such removal may render the segment unusable. This is because the segment groove must be repaired for it to be useable again. Then, a different type of gasket can perhaps be glued into the concrete segment to make the segment useable. However, if a gasket is damaged in transit or during installation of the concrete member, for example in a tunnel, there is no quick or easy way in the field to make the concrete member or segment useable again.

Another gasket design which has been recently developed, in addition to glued and feet-anchored gaskets, is a design which it is claimed anchors a gasket bottom face into a groove in a concrete segment with thousands of fibers that are disposed on a bottom face of the gasket. Such fiber anchored gaskets are said to be easily removable from the concrete segment. However, this type of gasket has its own disadvantages, a significant one being its cost. Replacement of such a gasket would necessitate using adhesive to secure a replacement gasket in the groove of the concrete segment or member, in addition to the possibly significant effort involved in cleaning the groove which may be needed before a replacement gasket can be installed.

Tunnel gasket designs are based on balancing the closure forces on the tunnel with the stress created to produce the necessary sealing capability required by particular project specifications. A constant balanced tension is required on the gaskets in order to achieve a reliable seal. Industry experts have voiced some concern regarding the potential effects of the Poisson coefficient on concrete when the closure forces allow the gasket material to flow to a point where there is a concentrated load on the corner of the last tunnel segment being installed to create the tunnel ring.

The Poisson coefficient or Poisson ratio is the negative ratio of transverse strains to axial strains on a material. When a compressive force acts on concrete, two types of strains will crop up. A first strain acts along the horizontal axis, and a second strain acts along the vertical axis. For static loads, such as in concrete, the coefficient should be about 0.20.

It would be desirable to provide a gasket which, through the function of its attachment to the concrete of the tunnel segment, precludes or minimizes the effects of the Poisson coefficient on the concrete tunnel segment by reducing the flow characteristic of the anchored gasket, versus present gasket designs used in the construction of tunnels.

It would also be advantageous to reduce labor costs that need to be incurred for field removal and replacement of gaskets because labor costs are a major component of construction project budgets. These project costs are typically cost-shared by local, state and national funding programs that are driven by tax and bond revenues.

It would therefore be desirable to provide a gasket which functions as an anchored gasket during the manufacture of concrete segments whereby an anchor element or elements act to attach or mount the gasket to the concrete segment, but which anchor element or elements allow the gasket to be removed and replaced in an economical manner if the gasket becomes damaged. It would also be desirable to provide a gasket construction which can be replaced with another gasket at the casting plant, in the storage yard, or on the job site without the need for extraordinary efforts or equipment, particularly as to field removal and replacement of the gasket. Also desirable would be the utilization of an identical replacement gasket which maintains the design criteria of the project without fear of violating any approved design parameters.

BRIEF SUMMARY

According to one embodiment of the present disclosure, a selectively detachable gasket for a concrete structure comprises a body including in cross-section a base wall, a first side wall, a second side wall and a top wall. A first anchor member extends from the gasket body adjacent the first side wall and the base wall. A second anchor member extends from the gasket body adjacent the second side wall and the base wall. A set of spaced indentations is located in the base wall. A gasket body comprises a resilient material and the first and second anchor members are sized such that the gasket body is selectively detachable from a groove defined in an associated concrete structure.

According to another embodiment of the present disclosure, there is provided a cast-in-place gasket for an associated concrete structure, the gasket comprising a gasket body formed from a resilient material, the body including in cross-section a base wall, a first side wall, a second side wall and a top wall. A first anchor member protrudes from the first side wall of the gasket body and is located adjacent the base wall. A second anchor member protrudes from the second side wall of the gasket body and is located adjacent the base wall. A first lip extends away from the first side wall. At least one first fin extends away from the first side wall, wherein the at least one first fin is located between the first anchor member and the first lip. A second lip extends away from the second side wall. At least one second fin extends away from the second side wall, wherein the at least one second fin is located between the second anchor member and the second lip. The first and second anchor members are sized such that the gasket body is selectively detachable from a groove defined in the associated concrete structure.

According to still another embodiment of the present disclosure, a cast-in-place gasket for an associated concrete structure comprises a gasket body formed of a resilient material, the gasket body having a longitudinal axis and including in cross-section a base wall, a first side wall, a second side wall and a top wall. A first anchor member protrudes radially from the first side wall of the gasket body and is located adjacent the base wall and runs along the longitudinal axis of the gasket body. A second anchor member protrudes radially from the second side wall of the gasket body and is located adjacent the base wall and runs along the longitudinal axis of the gasket body. The gasket body base wall includes a set of spaced indentations. The first and second anchor members are sized such that the gasket body is selectively detachable from a groove defined in the associated concrete structure.

According to a further embodiment of the present disclosure, a method for casting a removable gasket in a concrete structure comprises providing a gasket body, including first and second anchor members extending, respectively, from the gasket body on opposed side walls of the gasket body adjacent a base wall thereof, wherein the base wall of the gasket body includes a series of spaced indentations. The concrete structure is cast around the gasket body. A groove is formed in the concrete structure by the gasket body. Side channels are formed in the groove with the first and second anchor members. A series of spaced protrusions is formed on a surface of the concrete structure adjacent the base wall.

BRIEF DESCRIPTION OF THE DRAWINGS

The disclosure may take physical form in certain gasket designs and arrangements, several embodiments of which will be described in detail in the specification and illustrated in the accompanying drawings which form a part hereof and wherein:

FIG. 3 is a perspective view of a third type of prior art gasket which is said to be fiber-anchored in a groove formed in a concrete segment;

FIG. 6A is a cross-sectional view of a gasket according to another embodiment of the present disclosure;

FIG. 6B is a cross-sectional view of a gasket according to still another embodiment of the present disclosure;

FIG. 6C is a cross-sectional view of a gasket according to yet another embodiment of the present disclosure;

DETAILED DESCRIPTION

Figure 1:
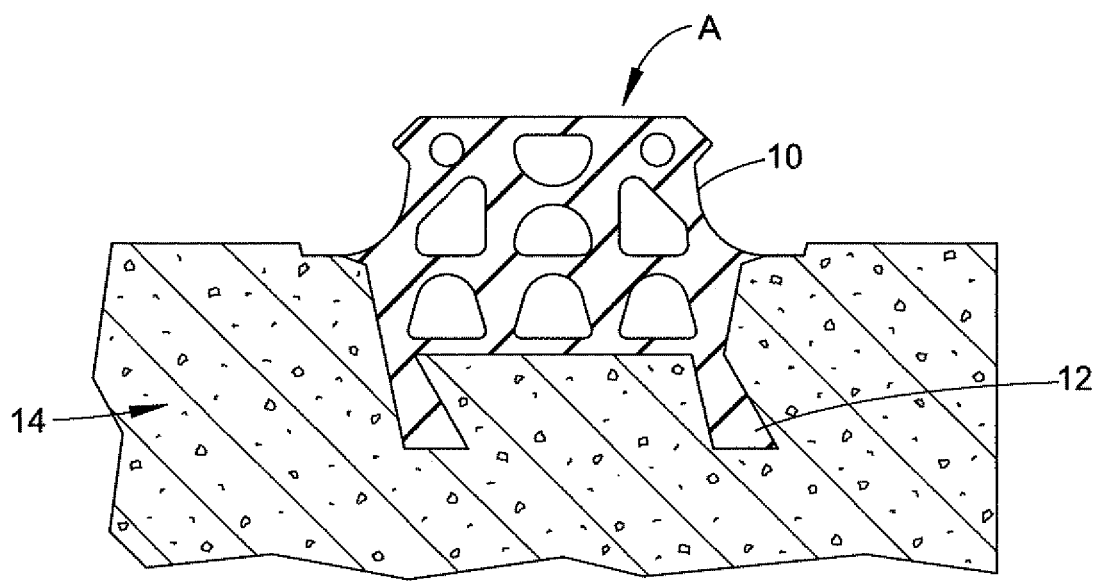
FIG. 1 is cross-sectional view of a portion of a concrete segment provided with a first type of prior art gasket which is anchored into the concrete segment.

It should be understood that the description and drawings herein are merely illustrative and that various modifications and changes can be made to the gaskets disclosed herein without departing from the present disclosure. In the drawings, the showings illustrate several embodiments. Several gasket designs according to the prior art and according to the instant disclosure are discussed but the instant disclosure is not intended to be limited to the disclosed embodiments.

With reference to FIG. 1, a gasket A according to a first known design of the prior art includes a gasket body 10 which is provided with one or more depending anchoring feet 12. These are embedded in a concrete segment 14 as the concrete is poured around the gasket. Such prior art gaskets, also known as cast-in-place gaskets, are directly anchored in the concrete segment via the anchoring feet 12 in order to keep the gasket in position in the concrete segment. As mentioned above, removal and replacement of the gasket A is difficult because the feet are embedded in the concrete. In fact, in the field, there is no quick or easy way to replace a defective gasket and make a concrete segment with such a defective gasket usable again.

Figure 2:
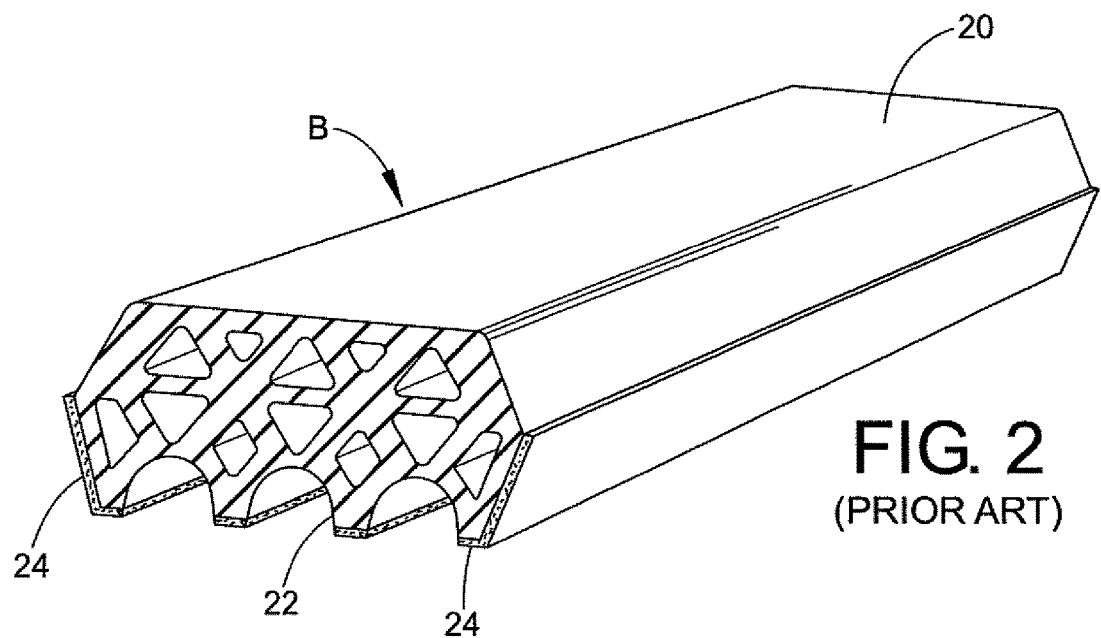
FIG. 2 is a perspective view of a second type of prior art gasket which can be glued in place in a groove formed in a concrete segment.

FIG. 2 illustrates a second known prior art design in which a gasket B includes a gasket body 20 which is provided with one or more legs 22 forming a bottom surface of the gasket. The legs and also opposing lower side faces of the gasket body 20 can be secured in place in a groove formed in a precast concrete segment by gluing the gasket to the concrete segment via a conventional adhesive 24. The adhesive is located between the bottom face of the gasket and the lower side faces thereof and the adjacent walls of the groove formed in the concrete segment. Field removal of a defective gasket B incurs significant labor costs. These include the removal of a defective gasket, the cleaning of the groove to remove any remaining gasket material or adhesive, the installation of a replacement gasket, and securing the replacement gasket in place with adhesive.

FIG. 3 illustrates a third known prior art design in which a gasket C is mounted in a groove formed in a concrete segment. In this design, a lower face 32 of a gasket body 30 is provided with a fiber layer 34. However, fiber-anchored gaskets may not be anchored in the groove sufficiently firmly, particularly during the process of installing tunnel segments. Also, the necessity of providing the gasket bottom with thousands of fibers add significantly to the cost of this prior art gasket.

Figure 4:
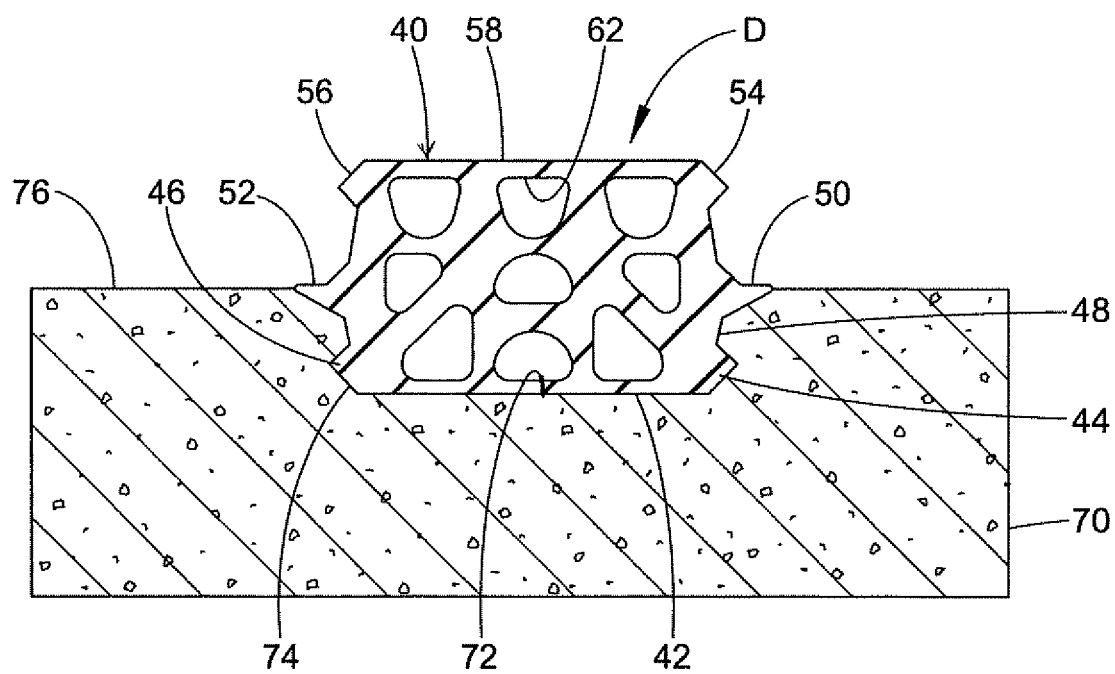
FIG. 4 is a cross-sectional view of a gasket according to one embodiment of the present disclosure, as installed in a concrete segment.

With reference now to FIG. 4, a gasket D according to a first embodiment of the present disclosure includes a gasket body 40 which includes a base wall 42. First and second anchor members 44 and 46 protrude from the gasket body. These are located on opposed side walls 48 of the gasket body and are located adjacent the gasket base wall 42. In one embodiment, the anchor members 44 and 46 can be considered as protrusions which in cross-section can have at least two planar wall sections that are oriented at an acute angle in relation to each other. Of course, other shapes are also contemplated for the anchor members, as will be discussed below. The anchor members 44 and 46 serve to retain the gasket in the groove of the concrete segment mold during casting of the precast concrete member or segment.

The gasket body 40 also includes opposed first and second lips 50 and 52 which can extend from the two opposed side walls 48. As is evident from FIG. 4, the lips serve to seal the groove in the concrete segment mold. Furthermore, the lips are considered advantageous in that they can serve to retard the seepage of liquids into the groove defined in the surface of the concrete segment. In this design, the gasket body also includes first and second protrusions 54 and 56 which are located on the opposed side walls 48 adjacent a top wall 58 of the gasket body. It should be apparent from a review of FIG. 4 that in this embodiment of the gasket, the first and second lips 50 and 52 are vertically spaced from the first and second anchor members 44 and 46. Similarly, the first and second protrusions 54 and 56 are vertically spaced from the lips 50 and 52. Thus, the lips 50 and 52 are disposed between the anchor members 44 and 46 on the one hand, and the first and second protrusions 54 and 56 on the other hand. It is also noted that the anchor members 44 and 46 are larger than are the first and second protrusions 54 and 56 in this embodiment of the gasket. Of course, other designs are also contemplated.

It should be apparent that one or more bores 62 of varying shapes in cross-section, including, triangular, semi-circular, bell-shaped or U-shaped, among others, can extend longitudinally through the gasket body 40 as is known in the art.

As mentioned, the gasket D is selectively secured to or mounted to a concrete segment 70, namely, the gasket is positioned in a groove 72 defined in the segment. The gasket D is held in place while the concrete member is cast around the gasket. Thus, the gasket defines or forms a groove in the concrete which flows around it. The first and second anchor members 44 and 46 extend into side channels 74 defined in the groove 72 of the concrete segment 70. It should be apparent from FIG. 4 that the anchor members 44 and 46 are held in the groove defined in the concrete segment. The anchor members provide a V-shape to the side channels 74 in this embodiment, in a complimentary fashion so that the anchor members simply sit in the side channels in use.

Should the original gasket in the concrete member or segment require replacement, the original or old gasket can be removed by simply pulling the gasket out of the groove and a replacement or new gasket can be snapped into place. The gasket can be pulled out of the groove due to the inherent resiliency of the material from which the gasket is manufactured. The first and second anchor members 44 and 46 are sized such that the gasket body is selectively detachable from the groove 72 defined in the concrete segment 70. The side channels 74 are located adjacent the side edges of the groove 72 such that the apexes of the V-shaped channels 74 defined in this embodiment are located above a base surface of the groove 72. Due to the resilient nature of the material from which the gasket is made, the gasket body 40 is able to flex enough so that a damaged gasket is removable and replaceable when that becomes necessary. The first and second lips 50 and 52 are positioned at a surface 76 of the concrete segment as is evident from FIG. 4.

Figure 5:
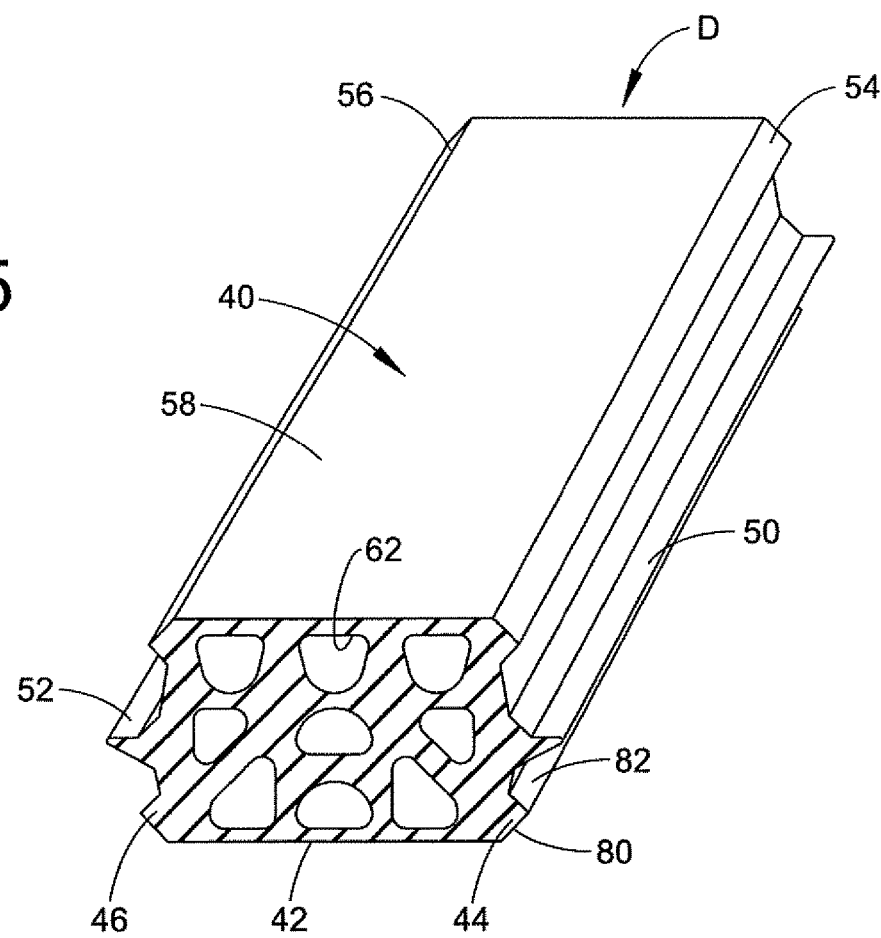
FIG. 5 is a perspective view of the gasket of FIG. 4.

With reference now also to FIG. 5, in the embodiment illustrated, the gasket D can extend a desired length, normally the length of the face of the concrete segment, and can include two opposed planar wall segments 80 and 82 which define each of the anchor members 44 and 46. As mentioned, the two planar or flat wall segments 80 and 82 can be disposed at an acute angle in relationship to each other. Thus, a generally V-shaped configuration in cross-section is provided for each of the anchor members 44 and 46. While the anchor members 44 and 46 are illustrated as containing two planar wall segments, it should be appreciated that anchor members having other geometric shapes, which may include three or more planar or otherwise-shaped wall segments is also contemplated.

An interference fit is provided between the groove 72 of the concrete segment 70 and the gasket body 40 such that the anchor members 44 and 46 can snap into and be pulled out of the side channels 74. One advantage of the gasket D is that it can be removed from groove 72 without the need for extraordinary effort or equipment. The reason why the gasket D can be selectively removed from its groove 72 without extraordinary effort is that the anchor members are so sized, and the gasket is comprised of an elastomeric material which allows the gasket body to be selectively detachable from the groove 72. This construction allows a defective gasket to be replaced in the field if that becomes necessary.

The gasket D may be made from a suitable elastomeric material such as, for example, ethylene propylene diene monomer (EPDM) rubber. Alternatively, one or more other elastomers having a Shore A hardness in the range of 30 to 75 can also be used. As such, many elastically deformable synthetic materials are useable for the material of the several gasket embodiments disclosed herein. Also, dual hardness gasket constructions are contemplated which can include a harder anchor section (i.e. the two anchor members being of a greater durometer) and a softer sealing section, i.e., the remainder of the gasket body being of a lesser durometer, or at least selected portions thereof can be of a lesser durometer. A co-extrusion of two different durometer elastomeric materials is thus contemplated in this embodiment. Alternatively, the body can be stiffer and the anchor sections softer under some circumstances.

With this design, the gasket D functions as an anchored gasket for concrete segment manufacturing. Yet, the gasket can be removed if it becomes damaged and replaced with another gasket either at the casting plant, in the storage yard, or on the job site. No extraordinary efforts or equipment are required for field removal and replacement of the gasket D. In this way, labor costs are greatly decreased, positively affecting project budgets. Moreover, no additional material, such as adhesive or fibers (which can be costly), is necessary to mount the gasket D to a concrete segment and secure it in place.

In one embodiment, the gasket can have a thickness of about 0.7 inches (1.8 cm) and a width of about 1.21 inches (3.07 cm) at the tips of the anchor members 44 and 46. The fins or lips 50 and 52 may protrude outwardly from the body 40 of the gasket such that the complete width of the gasket can be about 1.425 inches (3.62 cm). The width of the gasket at the first and second protrusions 54 and 56 can be about 1.152 inches (2.93 cm) if so desired. It should be appreciated that the lips 50 and 52 can be so located on the side surfaces of the gasket that the top surface of the lip is about 0.382 inches (0.97 cm) below the top surface of the gasket.

The anchor tip area of the gasket D basically needs to provide an inset recess which allows the concrete to enclose or trap the gasket base. Dimensionally, the anchor tip dimension can range from 0.060 to 0.200 inches (0.15 to 0.51 cm) per side depending upon the size of the gasket profile. Gasket profiles can range from 0.095 to 1.750 inches wide (0.24 to 4.45 cm). Since the gasket body "hinges" during its removal or replacement, the extension dimension of the anchor tips into the concrete will be altered as necessary based on the profile's overall width.

With reference now to the embodiment illustrated in FIG. 6A, a gasket E according to another embodiment of the instant disclosure includes a gasket body 90 having a base wall 92. Positioned on opposed side edges of the base wall 92 and extending from the side walls of the gasket E are first and second anchor members 94 and 96. In this embodiment, the anchor members have a generally semi-circular, curved or rounded configuration in cross-section as at 98. The anchor members 94 and 96 are designed to cooperate with suitably shaped side channels formed in a concrete segment (not illustrated). Also provided are first and second lips 100 and 102. As with the embodiment of FIG. 4, a defective or damaged gasket E can be removed from a groove in the concrete segment and replaced if that becomes necessary in the field without having to either scrap the concrete segment or send it back to the casting facility for repair or replacement of the gasket. The rounded face 98 of the first and second anchor feet 94 and 96 allows the gasket E to be readily snapped into the side channels formed in the concrete segment groove and be removed therefrom without undue effort.

With reference now to FIG. 6B, a gasket F according to still another embodiment of the present disclosure includes a gasket body 110 which is provided with a base wall 112, as well as anchor members 114 and 116 located on opposed side edges of the base wall. In this embodiment, the anchor members each include a first planar section 120 and a second planar section 122. Unlike the V-shaped configuration illustrated in the embodiment of FIGS. 4 and 5, FIG. 6B shows an embodiment in which the two planar sections of the anchor members are not disposed at an acute angle in relationship to each other. Rather, they are disposed at an obtuse angle in relationship to each other. As with the previous embodiments, the gasket F can be removed from side channels defined in a groove in a concrete segment without undue effort and a new gasket can be installed if that becomes necessary, even in the field.

With reference now to FIG. 6C, illustrated there is a gasket G according to yet another embodiment of the present disclosure. This embodiment includes a gasket body 130 having a base wall 132 and first and second anchor members 134 and 136 disposed on opposed side edges of the base wall of the gasket body. In this embodiment, the anchor members 134 and 136 each include a planar or flat upper section 140 and a rounded or curved lower section 142 disposed beneath the planar section. It should be appreciated that the side channels defined in the groove of the concrete segment are correspondingly shaped in the process of the concrete being cast around the gasket so as to readily accommodate the anchor members 134 and 136.

Figure 7:
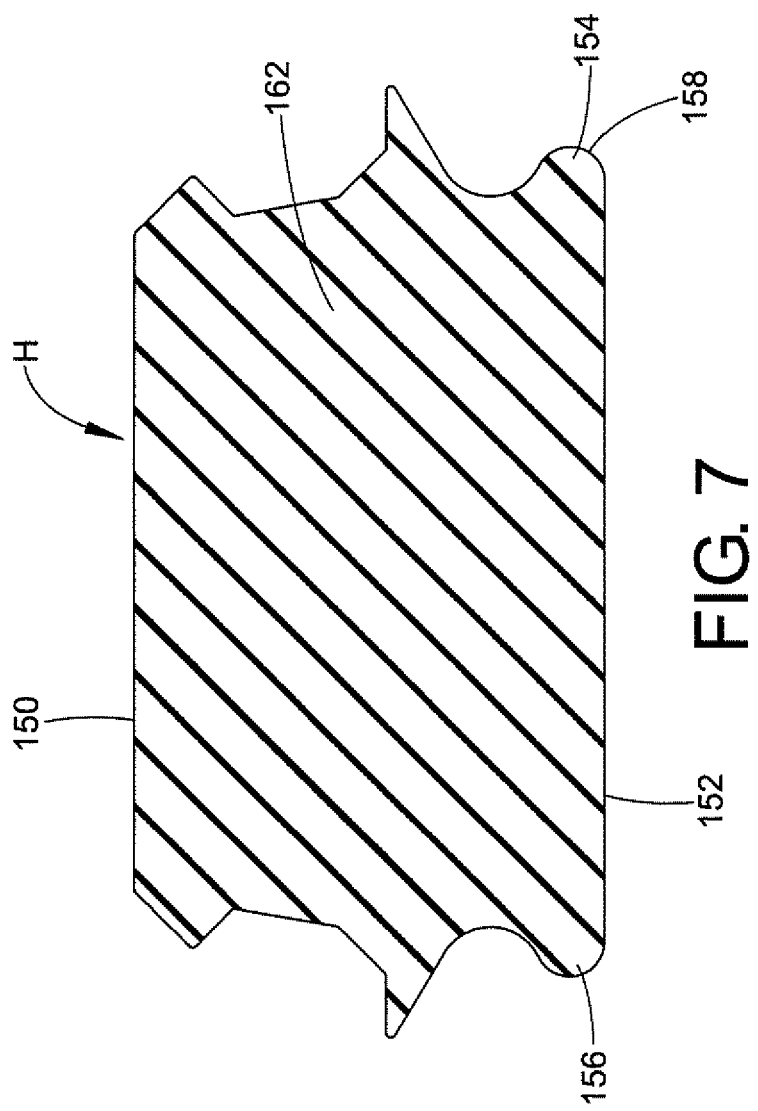
FIG. 7 is a cross-sectional view of a gasket according to a further embodiment of the present disclosure.

With reference now to FIG. 7, illustrated there is a gasket H according to a further embodiment of the present disclosure. This embodiment includes a gasket body 150 having a base wall 152 and first and second anchor members 154 and 156 which are disposed on opposed side edges of the base wall and located at the side walls of the gasket body. In this gasket embodiment, the anchor members 154 and 156 can each have a rounded face as at 158. In this embodiment, the gasket body 150 can be made of a closed cell sponge-type elastomeric material 162. Unlike the embodiments illustrated in FIGS. 4, 5 and 6A-6C, the gasket body 150 does not have any longitudinally extending bores defined in the gasket body. In the absence of bores, the closed cell sponge-like material 162 of the gasket H needs to be compressible enough so that it can be relatively easily removed from a groove defined in a concrete segment if that becomes necessary with the respective anchor members of a replacement gasket snapping into the side channels in the groove.

Figure 8:
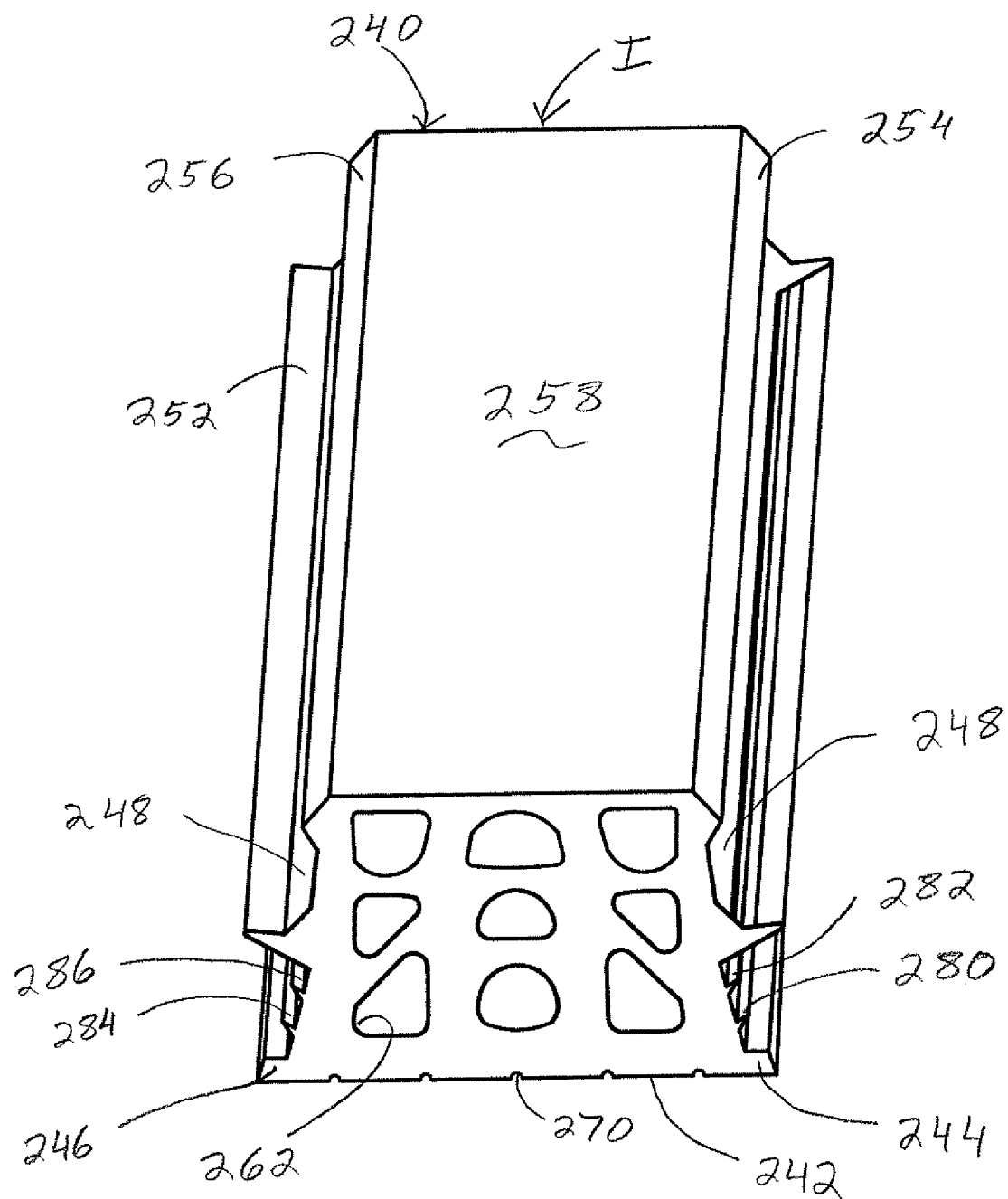
FIG. 8 is a top perspective view of a gasket according to a still further embodiment of the present disclosure.
Figure 10:
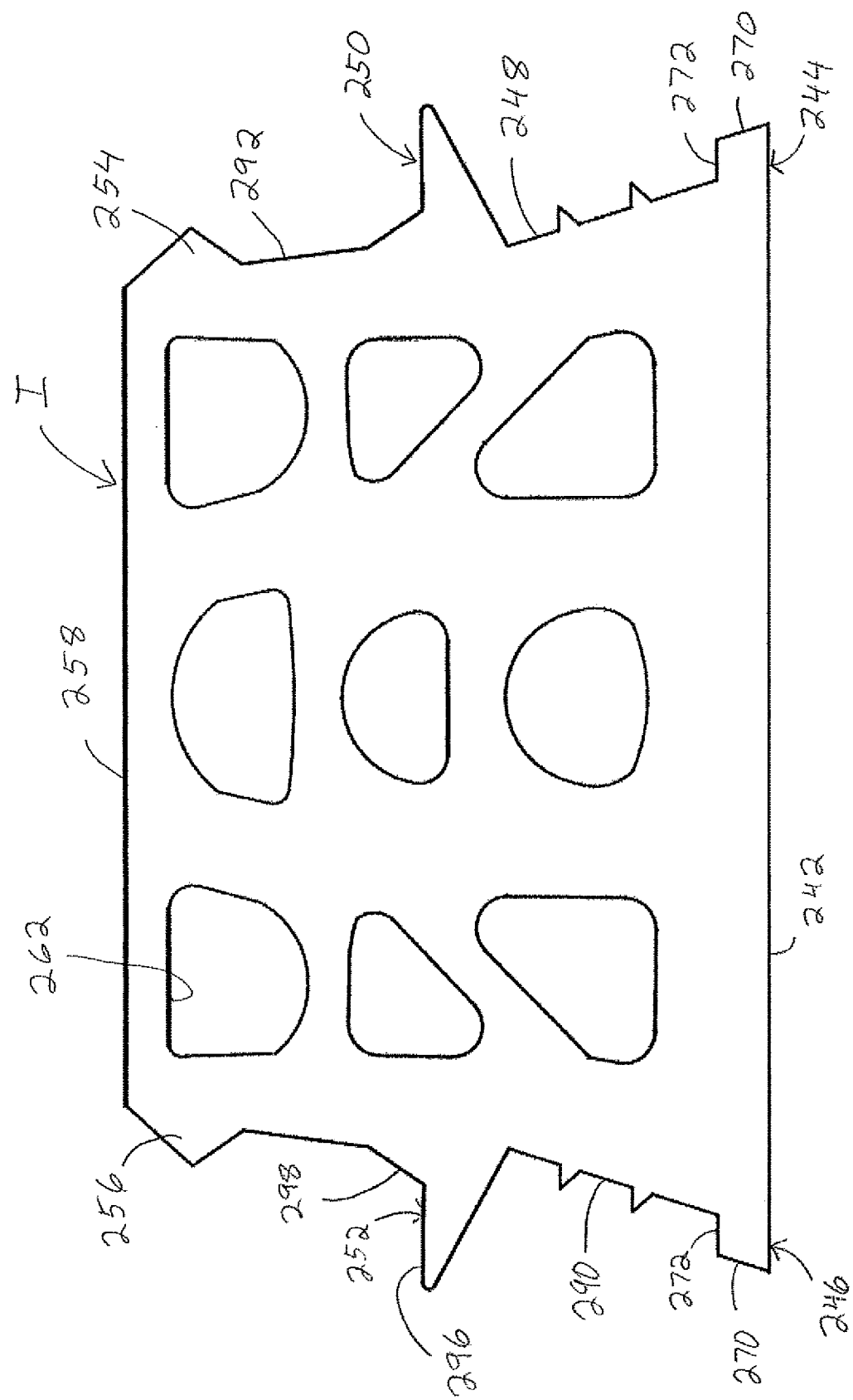
FIG. 10 is an enlarged end elevational view of the gasket of FIG. 8.

With reference now to FIG. 8, disclosed there is a gasket I according to a still further embodiment of the present disclosure. The gasket I comprises a gasket body 240 which includes a base wall 242. First and second anchor members 244 and 246 protrude from opposed side edges of the gasket body. More particularly, the first and second anchor members 244 and 246 are located on opposite side walls 248 of the gasket body and are positioned adjacent the gasket base wall 242. In one embodiment, the anchor members 244 and 246 can be considered as protrusions which, in cross-section, can include at least two planar wall sections, as best seen in FIG. 10. An upper one of the two planar wall sections may be oriented at an acute angle in relation to the base wall 242. Of course, other geometries are also contemplated. As with the other embodiments of the gasket disclosed herein, the anchor members 244 and 246 serve to retain the gasket in a groove of the concrete segment mold during casting of the precast concrete member or segment.

The gasket body 240 also includes opposed first and second lips 250 and 252 which can extend from the two opposed side walls 248. These lips serve to seal the groove in the concrete segment mold. In addition, the gasket body 240 can also include first and second protrusions 254 and 256 which are located on the opposed side walls 248 adjacent a top wall 258 of the gasket body. As is apparent from FIG. 10, the first and second lips 250 and 252 are vertically spaced from the first and second anchor members 244 and 246. Similarly, the first and second protrusions 254 and 256 are vertically spaced from the lips 250 and 252. Thus, the lips 250 and 252 can be disposed between the anchor members 244 and 246 on the one hand and the first and second protrusions 254 and 256 on the other hand.

It should be apparent that one or more bores 262, which bores can have varying shapes in cross section, can extend longitudinally through the gasket body 240, as is known in the art.

Figure 9:
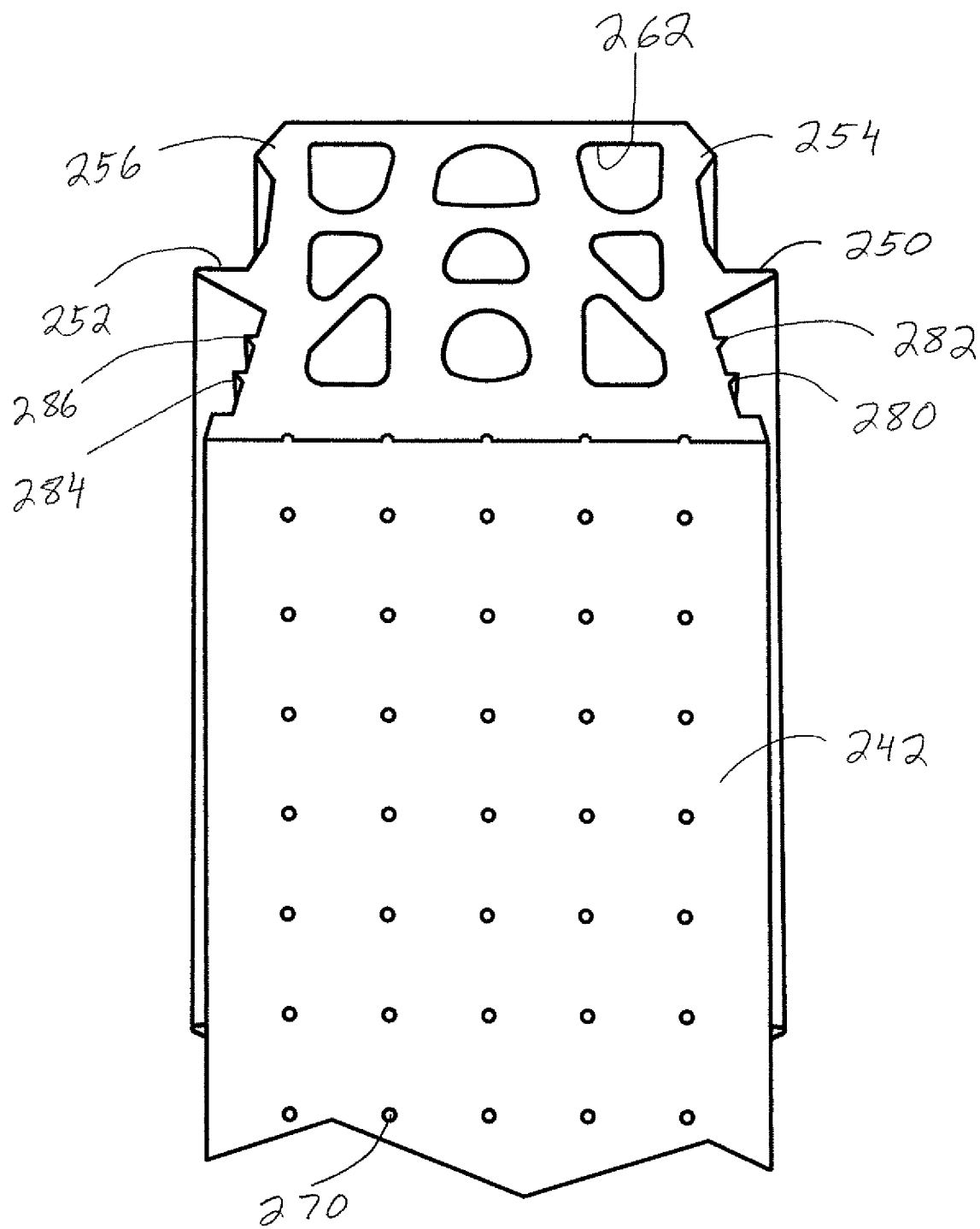
FIG. 9 is a bottom perspective view, slightly enlarged, of the gasket of FIG. 8.

With reference now also to FIG. 9, in this embodiment, there is provided in the base wall 242 a set of indentations 270. In one embodiment, the indentations 270 can be spaced apart from each other in a 0.250 inches by 0.250 inches squared layout or array which runs the length of the base wall 242. The indentations can be conical in shape. In one embodiment, the indentations can be from 0.010 inches to 0.045 inches deep. Also, the indentations can be from 0.030 inches to 0.080 inches in diameter. In addition to conical indentations, it is also contemplated that the indentations could be triangular, rectangular or just rounded based on the profile.

It should be appreciated that the shape, size, and placement of the indentations 270 in the gasket base wall 242 can be altered based on a particular application. Thus, these functional design elements may vary from project to project. In one embodiment, the indentations can have a diameter between 0.020 and 0.030 inches, with a spacing of 0.250 by 0.250 inches across the width and length of the base wall 242 of the gasket. Needless to say, other sizes, shapes for the indentations, and spacings for them are also possible.

The indentations 270 prove useful in creating a roughened concrete surface in the base of the groove defined in the concrete member in which the gasket is retained during the casting of the precast concrete member. The concrete is roughened because little raised bumps are created in the adjacent concrete surface by these indentations in the gasket base wall. The roughened concrete surface formed by the indentations in the gasket base wall will increase the friction between the gasket and the concrete at that surface in order to assist in retarding or preventing a sliding of the gasket in the groove formed by the gasket. In addition, the indentations 270 in the gasket base wall help to strengthen the attachment of the gasket in the concrete member in lower strength concrete during the demolding process.

It has been found that with weaker concrete, the precast concrete member can fracture if the gasket dislodges during the demolding process, In higher strength concrete, the designs illustrated in FIGS. 4-6C work well. However, in lower strength concrete, the gasket design illustrated in FIGS. 8-10 appears to work better. The strength of the concrete is relative to when the concrete member, such as a tunnel segment, is demolded, i.e., removed from the mold. Lower strength concrete at that time is the concern. Lower strength can be defined as concrete having the strength of 12 to 16 MPa, as this happens in certain projects. Most concrete mixes will be in the 20 plus MPa range and that is fine for segment removal. The final thirty day strength of the concrete is not a concern for the gasket, since the final strength is always much greater. For example, it can be at least 28 MPa or higher. But, during the demolding process, the concrete has not yet had a chance to fully cure (since that takes a number of days) and, hence, the concrete is of lower strength at this point.

Another benefit of roughening the surface and the concrete via the provision of the small spaced indentations 270 in the base wall 242 of the gasket is that the gasket profile has an increased ability to be linearly secured to the tunnel segment when sliding forces are applied under certain installation conditions.

With reference again to FIG. 10, positioned between the anchor member 244 and the lip 250 can be small protrusions, which can also be termed wings or fins 280 and 282. Similarly, positioned between the anchor member 246 and the lip 252 can be small fins 284 and 286. It should be appreciated that the sets of fins 280, 282 and 284, 286 extend away from the respective side wall 248 of the gasket. Also, the fins can be spaced from each other. In one embodiment, the fins can be generally triangular in shape, approximately 0.025 inches in width and can extend 0.030 inches away from the side wall 248. It should be appreciated that the sizes of the fins, there spacing from each other, and the numbers of fins provided on each side wall of the gasket can be varied as may be desired or may provide advantageous for a particular concrete construction. In one embodiment, the fins 280 and 282 can be equally spaced apart from each other and also from the respective adjacent anchor member 244 and lip 250, as is evident from FIG. 10. A similar relationship exists between the fins 284 and 286 and the anchor member 246, as well as the lip 252. In one embodiment, the fins 280-286 can be continuous along the length of the gasket side wall 248. However, discontinuous fins are also contemplated if they would prove useful in a particular application. These fins or protrusions also assist in the gasket I in resisting a pull out during the casting and demolding process for the concrete segment. Thus, the fins help secure the gasket I in the concrete segment and aid in retarding a premature pull out.

With continued reference to FIG. 10, it can be seen that each of the anchor members 244 and 246 includes a generally planar side wall 270 and a generally planar top wall 272. The top wall can be disposed at an acute angle in relation to the gasket base wall 242 in the embodiment illustrated in FIG. 10. Also, it should be apparent that the set of fins 280-286 includes in cross section two planar wall portions that merge in order to create a generally triangular cross-sectional shape for the fins. In addition, in this embodiment, the fins 280-286 are angled somewhat upwardly so that they point towards the lips 250 and 252 and away from the first and second anchor members 244 and 246.

In the embodiment illustrated in FIGS. 8-10, it should be apparent that the respective side walls 248 of the gasket are comprised of two separate sections which may extend at an acute angle in relation to each other. These sections are side wall section 290 and side wall section 292 which are located, respectively, on opposed sides of the lips 250 and 252. In this embodiment, the respective lips 250 and 252 include a planar base wall section 294 and a top wall section which is comprised of a first section 296 and a second section 298, which second section is angled at an obtuse angle in relation to the first top wall section 296. The second section 298 then merges into the upper side wall section 292 in this embodiment.

As with the gasket embodiment illustrated in FIG. 4, the gasket I can be selectively secured to or mounted to a concrete segment during the concrete casting process, such that the gasket is positioned in a groove defined in the segment during the casting process by the gasket itself. In other words, the gasket I is held in place while the concrete member is cast around the gasket. In this way, the gasket defines or forms a groove in the concrete which flows around it. The first and second anchor members 244 and 246 extend into side channels defined in the groove. Similarly, the four sets of fins 280-286 extend into smaller side channels open to the groove and defined by the gasket's fins during the casting process.

All of the indentations 270 in the base and the small fins 280-286 help to strengthen the attachment of the gasket to the concrete segment in lower strength concrete during the demolding process.

Should the original gasket in the concrete member require replacement, the original gasket can be removed by simply pulling the gasket out of the groove and replacing it with a new gasket which can then be snapped into place. The gasket can be pulled out of the groove due to the inherent resiliency of the elastomeric material from which the gasket is manufactured. To this end, the first and second anchor members 244 and 246, as well as the sets of fins 280-286 are sized such that the gasket body is selectively detachable from the groove defined in the concrete segment, with the gasket remaining intact during the detachment process. Due to the resilient nature of the elastomeric material from which the gasket I is made, the gasket body 240 is able to flex enough so that a damaged gasket can be removed in an intact manner and can be replaced when that becomes necessary.

In one embodiment, the gasket I can be somewhat trapezoidal in shape such that the width of the bottom face of the gasket (without the anchor members) is 1.420 inches, whereas the width of the gasket top face (even including the protrusions 254 and 256) is 1.160 inches. The distance between the bottom face of each anchor member and the top face of each lip can be 1.0 inches. In one embodiment, the top faces of the respective anchor members 244 and 246 can be canted downwardly in relation to the respective bottom faces of the anchor members. In one embodiment, the side walls of the gasket between the respective anchor members and the respective lips can be angled inwardly at approximately a 35 degree angle. If desired, the lips 250 and 252 can extend past the anchor members 244 and 246 such that the width of the gasket from the tip of one lip to the tip of the opposed lip can be 1.465 inches, whereas the width of the bottom face of the gasket when including the anchor members is 1.420 inches.

As previously noted, the material of the gasket body in the embodiments of FIGS. 4-6C and 8-10 can typically be made of EPDM (ethylene propylene diene monomer) or Neoprene (polychloroprene or pc-rubber) which is a synthetic rubber that can have a durometer of 65 to 75 on the Shore A hardness scale. Regarding the sponge-type gasket H illustrated in FIG. 7, the material can be a medium to firm density EPDM, Neoprene or a similar rubber or elastomeric material. It can be a 2A3/2A4 or 2C3/2C4 material on the ASTM D1056 standard for cellular materials. The density of the material would be determined based on the closure force required for the contemplated concrete tunnel segments. In this type of material, instead of a durometer measurement on the Shore A hardness scale, the force in PSI which is required to compress the material to 25% of its thickness is measured and stated in compression deflection units. One advantage of the material illustrated in FIG. 7 is that the sponge-type material of the gasket is designed to compress with less force than the generally denser material of the gaskets illustrated in FIGS. 4-6C. The sponge-type gasket H would be most frequently used in low pressure applications (<5 bar) where installation methods rely on the weight of the concrete segment to close the joints. Such joints are generally found in vertical installations, such as in shafts and the like.

Disclosed has been a tunnel segment gasket which includes first and second anchor members that protrude from opposed side edges at the base of the gasket. The anchor members are configured to attach the gasket to a concrete tunnel segment during the casting of the pre-cast concrete tunnel segment. As the tunnel segment is being cast from concrete, the gasket forms a groove in the concrete, including forming side channels in the groove, the side channels being defined by the anchor members of the gasket. Should a defect be found in the gasket which has been cast-in-place in the concrete tunnel segment or like concrete member, such a defective gasket can be removed from the groove relatively easily. A replacement gasket can then be snapped into the groove in place of the original gasket. The replacement gasket will have corresponding anchor members which will extend into the side channels defined in the groove of the associated concrete member.

If a cast-in-place gasket according to the present disclosure has become defective, either at the manufacturing plant or in the field, it can be removed and replaced with an intact gasket in an economical and time efficient manner. More particularly, because the gasket when it was cast-in place formed not only a groove in the concrete structure but also first and second side channels extending from the groove due to the presence of the anchor members, the gasket body can be removed in an intact manner from the groove such that the anchor members are pulled out of the side channels. This is possible because the gasket body comprises a resilient material and the first and second anchor members are so sized that the gasket body is detachable from the concrete structure in an intact manner thereby simplifying its removal. A replacement gasket body could also include first and second anchor members of the same size as the one which was removed. The replacement gasket body can be inserted into the groove such that the anchor members are inserted into the side channels of the concrete structure. In this way, a replacement gasket can be installed in the field eliminating the need for the use of glue or adhesive, as well as the potential need for returning the concrete member (such as a tunnel segment) from the field back to the factory for the installation of such a replacement gasket.

The present disclosure has been described with reference to several embodiments. Obviously, modifications and alterations will occur to others upon a reading and understanding of the preceding detailed description. It is intended that the present disclosure be construed as including all such modifications and alterations insofar as they come within the scope of the appended claims or the equivalents thereof.

The invention claimed is:

1. A selectively detachable gasket for concrete structures, the gasket comprising:
   a body including in cross-section a base wall, a first side wall, a second side wall, and a top wall;
   a first anchor member extending from the gasket body adjacent the first side wall and the base wall;
   a second anchor member extending from the gasket body adjacent the second side wall and the base wall;
   at least one lip extending from at least one of said first and second side walls;
   at least one fin extending away from at least one of said first and second side walls;
   a first protrusion extending away from the first side wall of the gasket body and a second protrusion extending away from the second side wall of the gasket body, and wherein the first and second protrusions are spaced from a respective one of the first and second anchor members;
   a set of spaced indentations located in the base wall; and
   wherein the gasket body comprises a resilient material such that the gasket body is selectively removable intact from side channels formed in a groove defined in an associated concrete structure.

2. The gasket of claim 1 further comprising at least one bore extending longitudinally in the body.

3. The gasket of claim 2 wherein a plurality of spaced bores extend longitudinally in the gasket body and wherein the plurality of bores extend in a common direction.

4. The gasket of claim 3 wherein a cross-sectional shape of the plurality of spaced bores is one of a triangular shape, a semi-circular shape, a bell shape and a U-shape.

5. The gasket of claim 3 wherein a durometer of the first and second anchor members is different than a durometer of the body.

6. The gasket of claim 1 wherein the gasket body comprises ethylene propylene diene monomer (EPDM), Neoprene or a similar rubber material.

7. The gasket of claim 1 wherein the first and second anchor members are of the same size.

8. A cast-in-place gasket for an associated concrete structure, the gasket comprising:
   a gasket body formed from a resilient material, the body including in cross-section a base wall, a first side wall, a second side wall and a top wall;

a first anchor member protruding from the first side wall of the gasket body and located adjacent the base wall;

a second anchor member protruding from the second side wall of the gasket body and located adjacent the base wall;

a first lip extending away from the first side wall;

at least one first fin extending away from the first side wall, wherein the at least one first fin is located between the first anchor member and the first lip;

a second lip extending away from the second side wall;

at least one second fin extending away from the second side wall, wherein the at least one second fin is located between the second anchor member and the second lip;

wherein the gasket body is selectively removable intact from side channels formed in a groove defined in the associated concrete structure by the gasket; and a first protrusion extending away from the first side wall of the gasket body and a second protrusion extending away from the second side wall of the gasket body, and wherein the first and second protrusions are spaced from a respective one of the first and second anchor members.

9. The gasket of claim 8 wherein a durometer of the first and second anchor member is different from a durometer of the gasket body.

10. The gasket of claim 8 further comprising at least one bore which extends in the gasket body in a direction parallel to a longitudinal axis of the gasket body.

11. The gasket of claim 8 wherein the gasket body comprises ethylene propylene diene monomer (EPDM), Neoprene or a similar rubber material.

12. A cast-in-place gasket for an associated concrete structure, the gasket comprising:

a gasket body formed of a resilient material, the gasket body having a longitudinal axis and including in cross-section a base wall, a first side wall, a second side wall, and a top wall;

a first anchor member protruding outwardly from the first side wall of the gasket body and located adjacent the base wall and running along the longitudinal axis of the gasket body;

a second anchor member protruding outwardly from the second side wall of the gasket body and located adjacent the base wall and running along the longitudinal axis of the gasket body;

at least one fin extending away from at least one of said first and second side walls;

at least one lip extending from at least one of said first and second side walls;

at least one protrusion extending away from at least one of said first and second side walls and wherein said at least one protrusion is spaced from a respective one of said first and second anchor members;

wherein the gasket body base wall includes a series of spaced indentations; and wherein the gasket body is selectively removable intact from side channels defined in the associated concrete structure during the casting in place of the gasket.

13. The gasket of claim 12 further comprising at least one bore which extends in the gasket body in a direction parallel to a longitudinal axis of the gasket body.

14. The gasket of claim 12 wherein a durometer of the first and second anchor members is different from a durometer of the gasket body.

15. The gasket of claim 12 wherein said at least one fin comprises a first fin extending away from the first side wall of the gasket body and a second fin extending away from the second side wall of the gasket body.

16. The gasket of claim 15 wherein said at least one lip comprises a first lip extending away from the first side wall and a second lip extending away from the second side wall, wherein the first and second fins are positioned, respectively, between the first and second anchor members and the first and second lips.

17. A method for casting a removable gasket in a concrete structure comprising:

providing a gasket body including first and second anchor members extending, respectively, from the gasket body on opposed side walls of the gasket body adjacent a base wall thereof, wherein a base wall of the gasket body includes a series of spaced indentations and wherein said gasket body further includes at least one fin, at least one lip and at least one protrusion each extending from one of opposed side walls of the gasket body;

casting the concrete structure around the gasket body;

forming a groove in the concrete structure by the gasket body, wherein the gasket body can be selectively removable intact from the groove in the concrete structure;

forming side channels in the groove with the first and second anchor members; and forming a series of spaced protrusions on a surface of the concrete structure adjacent the base wall.

\* \* \* \* \*